(12) United States Patent
Cai

(10) Patent No.: US 11,862,910 B2
(45) Date of Patent: Jan. 2, 2024

(54) PLUG STRUCTURE AND ELECTRONIC DEVICE

(71) Applicant: GUANGDONG OPPO MOBILE TELECOMMUNICATIONS CORP., LTD., Dongguan (CN)

(72) Inventor: Hongzhen Cai, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 17/711,866

(22) Filed: Apr. 1, 2022

(65) Prior Publication Data
US 2022/0231472 A1 Jul. 21, 2022

Related U.S. Application Data

(63) Continuation of application No. PCT/CN2020/120040, filed on Oct. 9, 2020.

(30) Foreign Application Priority Data

Oct. 14, 2019 (CN) .......................... 201910974381.6

(51) Int. Cl.
*H01R 24/68* (2011.01)
*H01R 13/44* (2006.01)
*H01R 103/00* (2006.01)

(52) U.S. Cl.
CPC ............. *H01R 24/68* (2013.01); *H01R 13/44* (2013.01); *H01R 2103/00* (2013.01)

(58) Field of Classification Search
CPC .... H01R 24/68; H01R 13/44; H01R 2103/00; H01R 13/04; H01R 35/04; H01R 13/15; H02J 7/0042
See application file for complete search history.

(56) References Cited

U.S. PATENT DOCUMENTS 6,273,735 B1  8/2001  Johnson et al.
6,275,002 B1*  8/2001  Chen ..................... H01M 10/46
                                                           439/131

(Continued)

FOREIGN PATENT DOCUMENTS

CN         1707873 A    12/2005
CN       201061054 Y     5/2008

(Continued)

OTHER PUBLICATIONS

Extended European Search Report dated Sep. 8, 2022 received in European Patent Application No. EP20876956.2

(Continued)

*Primary Examiner* — Truc T Nguyen
(74) *Attorney, Agent, or Firm* — Sheppard, Mullin, Richter & Hampton LLP

(57) ABSTRACT

A plug structure and an electronic device are provided. The plug structure includes a plug body and a plug. The plug body has an accommodating groove configured to accommodate the plug. The plug includes a rotating shaft and a plurality of pins. The rotating shaft is slidably arranged in the accommodating groove and is rotatable to at least a first position and a second position. When the rotating shaft is rotated to the first position, the plurality of pins is accommodated in the accommodating groove. When the rotating shaft is rotated from the first position to the second position, the plurality of pins protrudes out of the plug body from the accommodating groove. The plug structure and the electronic device are small in size and can be easily stored and carried around.

19 Claims, 10 Drawing Sheets

(56) References Cited

U.S. PATENT DOCUMENTS

| | | | |
|---|---|---|---|
| 8,033,847 B1* | 10/2011 | Chen | H01R 29/00 439/172 |
| 9,472,899 B1 | 10/2016 | Reedy et al. | |
| 10,535,965 B1* | 1/2020 | Sultenfuss | H01R 13/5213 |
| 2004/0212343 A1* | 10/2004 | Sakai | H01R 35/04 320/111 |
| 2005/0153588 A1* | 7/2005 | Liao | H01R 31/06 439/172 |
| 2007/0091545 A1* | 4/2007 | Wong | H01R 35/04 361/600 |
| 2009/0117768 A1* | 5/2009 | Liao | H01R 13/6273 439/300 |
| 2010/0148722 A1* | 6/2010 | Zhang | H01R 24/68 320/107 |
| 2011/0223787 A1* | 9/2011 | Chen | H01R 31/06 439/131 |
| 2018/0191117 A1* | 7/2018 | Wu | H01R 13/405 |
| 2020/0083639 A1* | 3/2020 | Stanfield | H01R 13/6275 |
| 2023/0136225 A1* | 5/2023 | Lee | H01R 13/02 363/146 |

FOREIGN PATENT DOCUMENTS

| | | |
|---|---|---|
| CN | 203243070 U | 10/2013 |
| CN | 103545645 A | 1/2014 |
| CN | 104011948 A | 8/2014 |
| CN | 104836050 A | 8/2015 |
| CN | 205911503 U | 1/2017 |
| CN | 206226065 U | 6/2017 |
| CN | 110247254 A | 9/2019 |
| JP | H05152026 A | 6/1993 |
| JP | 2009037879 A | 2/2009 |

OTHER PUBLICATIONS

First Office Action from corresponding Chinese Application No. 201910974381.6, dated Jul. 22, 2021. English translation attached.

The Second Office Action from corresponding Chinese Application No. 201910974381.6, dated Jan. 26, 2022. English translation attached.

International Search Report and Written Opinion dated Jan. 13, 2021 in International Application No. PCT/CN2020/120040. English translation attached.

Intent to Grant dated Jun. 6, 2022 from corresponding Chinese Application No. 201910974381.6. English translation attached.

* cited by examiner

PLUG STRUCTURE AND ELECTRONIC DEVICE

CROSS-REFERENCE TO RELATED APPLICATIONS

The present application is a continuation of International Application No. PCT/CN2020/120040, filed on Oct. 9, 2020, which claims priority to Chinese Patent Application No. 201910974381.6, titled "PLUG STRUCTURE AND ELECTRONIC DEVICE", and filed on Oct. 14, 2019, the entire disclosures of which are incorporated herein by their references.

FIELD

The present disclosure relates to the field of electrical appliances, and more particularly, to a plug structure and an electronic device.

BACKGROUND

The increase of electronic products, especially the appearance of portable products, has greatly facilitated people's lives. Accordingly, a large number of electronic products need to be equipped with a battery for power supply when they are carried around, and non-reusable batteries are undoubtedly a huge waste. Therefore, most of the existing electronic products are equipped with rechargeable batteries, and correspondingly, chargers are required.

SUMMARY

An object of the present disclosure is to provide a plug structure and an electronic device that are small in size and can be easily stored and carried around.

In a first aspect of the present disclosure, a plug structure is provided. The plug structure includes a plug body and a plug. The plug body has an accommodating groove configured to accommodate the plug; the plug includes a rotating shaft and a plurality of pins; the rotating shaft is slidably arranged in the accommodating groove and is rotatable to at least a first position and a second position; when the rotating shaft is rotated to the first position, the plurality of pins is accommodated in the accommodating groove; and when the rotating shaft is rotated towards a top end of the plug body from the first position to the second position, the plurality of pins protrudes out of the plug body from the accommodating groove.

In a second aspect of the present disclosure, an electronic device is provided. The electronic device includes a circuit module and the plug structure in the first aspect. The circuit module is electrically connected to the plurality of pins of the plug structure.

In the plug structure, the plurality of pins can be in a retracted state so as to be accommodated in the accommodating groove. When needed to be expanded for use, the plurality of pins can slide and rotate along a sliding groove to protrude out of the sliding groove for use. Therefore, when the plug structure is not in use, the plurality of pins is retracted to reduce a space occupied by the plurality of pins, which is convenient for carrying and storage.

In this case, when the plurality of pins slides to a working state, the rotating shaft is rotated from the first position to the second position, and the plurality of pins moves towards the top end of the plug body, thereby shortening a distance between the plurality of pins and an end surface of the top end of the plug body. Therefore, when the plug structure is plugged into a socket, the plug structure occupies a smaller space, such that the plug structure neither "invades" a space of an adjacent position in the socket, nor affects plugging and use of another plug structure.

Therefore, when an electronic device containing such a plug structure is used, the plug structure occupies a smaller space, such that the plug structure facilitates carrying and using the electronic device, and prevents the electronic device from affecting the plugging and use of another electronic device when being plugged into the socket.

Figure 1:
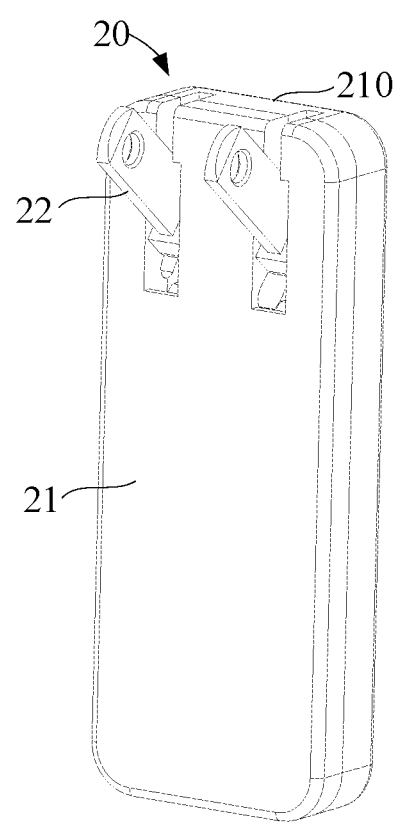
FIG. 1 is a perspective view of a charger according to an embodiment of the present disclosure.

Reference numerals of accompanying drawings are explained as follows:

1, charger;
10, charging module; 11, main board; 20, plug structure;
21, plug body; 210, top end; 211, accommodating groove; 2111, first accommodating groove; 2112, second accommodating groove; 2113, third accommodating groove; 2115, first guide groove; 2116, second guide groove; 212, upper housing; 2121, via hole; 2122, snapping groove; 213, lower housing; 214, sliding groove; 2141, first end; 2142, second end; 2143, first limiting member; 2144, second limiting member; 2145, first sliding groove; 2146, second sliding groove; 215, boss; 216, through groove;
22, plug; 221, rotating shaft; 222, pin; 223, end portion; 23, connecting member; 232, convex post; 233, first convex rib; 234, second convex rib;

24, elastic conductive sheet; 241, elastic portion;
30, accommodating chamber; 301, upper accommodating chamber; 302, lower accommodating chamber;
40, circuit module; 41, energy storage unit; 42, charging and discharging circuit.

DESCRIPTION OF EMBODIMENTS

Although the present disclosure can be easily embodied in different forms of embodiments, only some specific embodiments are illustrated in the accompanying drawings and described in detail in this specification. Also, it can be understood that this specification should be regarded as exemplary description of principles of the present disclosure, and is not intended to limit the present disclosure to the description made herein.

Therefore, a feature described in this specification is used to describe one of the features of an embodiment of the present disclosure, rather than implying that each embodiment of the present disclosure must have the described feature. In addition, it should be noted that this specification describes many features. Although some features can be combined together to illustrate possible system designs, these features can also be used in other unspecified combinations. Consequently, unless otherwise stated, combinations illustrated herein are not intended to be limiting.

Exemplary embodiments will now be described in detail below with reference to the accompanying drawings. However, the exemplary embodiments can be implemented in various forms, and should not be construed as being limited to examples set forth herein. On the contrary, the exemplary embodiments are provided to facilitate thorough and comprehensive description of the present disclosure, and fully convey the concept of the exemplary embodiments to those skilled in the art. The accompanying drawings are only schematic illustrations of the present disclosure and are not necessarily drawn to scale. Same reference numerals in the figures denote same or similar parts, and thus repeated description of the same reference numerals will be omitted here.

In addition, described features, structures, or characteristics may be combined in one or more example embodiments in any suitable manner. In the following description, many specific details are provided to facilitate solid understanding of the exemplary embodiments of the present disclosure. However, it is conceivable for those skilled in the art that technical solutions of the present disclosure can be practiced without one or more specific details, or other methods, components, steps, etc., can be adopted. In other cases, well-known structures, methods, implementations, or operations are not illustrated or described in detail to highlight and avoid obscuring various aspects of the present disclosure.

Some of the block diagrams illustrated in the figures are functional entities and do not necessarily correspond to physically or logically independent entities. These functional entities may be implemented in a form of software, or in one or more hardware modules or integrated circuits, or in different networks and/or processor apparatuses and/or microcontroller apparatuses.

Preferred embodiments of the present disclosure will be further described in detail below in conjunction with the accompanying drawings in the specification.

At present, since a plug structure of a charger has a plurality of outstretched pins, the plug structure of the charger often occupies a large space, which hinders portable storage of the charger.

The present disclosure proposes an electronic device including a circuit module and a plug structure. The circuit module is electrically connected to the plug structure. The circuit module and the plug structure can be integrally formed as one piece, the plug structure has an accommodating groove defined therein, and the accommodating groove is configured to accommodate the circuit module. Alternatively, the circuit module and the plug structure may be formed as separate pieces, and the circuit module can be detachably connected to the plug structure.

The electronic device can be a charger, a mobile power supply, or a plug adapter. Specifically, in the present disclosure, description is made by taking the electronic device being the charger and the circuit module being a charging module as an example.

Figure 2:
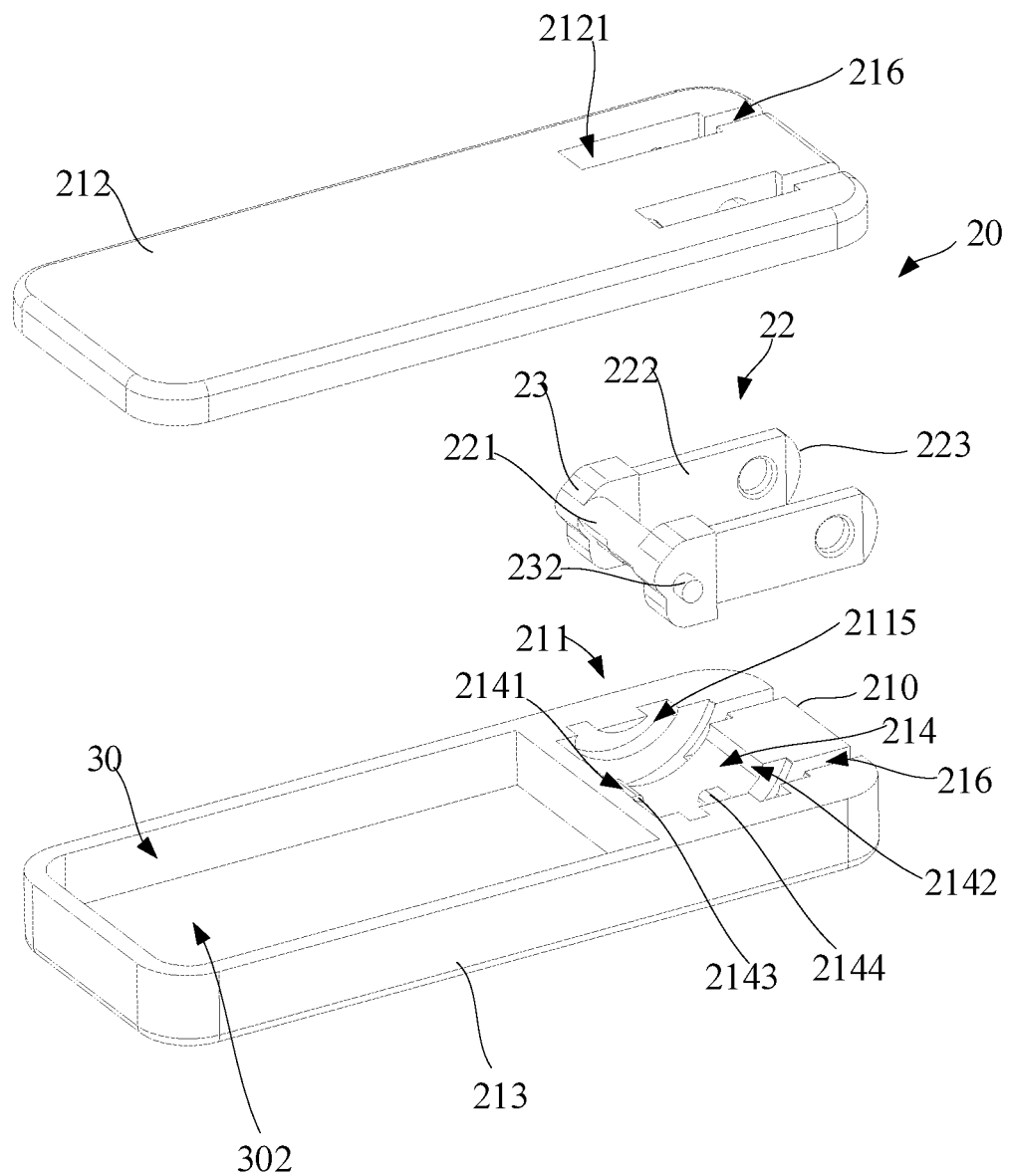
FIG. 2 is an exploded view of the charger illustrated in FIG. 1.

In some embodiments, referring to FIG. 1 and FIG. 2, a charger 1 includes a charging module 10 and a plug structure 20. A plug body 21 of the plug structure 20 has an accommodating chamber 30 defined therein. The accommodating chamber 30 is configured to accommodate the charging module 10, and the charging module 10 is electrically connected to a plug 22 of the plug structure 20. The plug structure 20 is configured to be connected to an external power supply to provide power to the charging module 10. The charging module 10 is electrically connected to an apparatus to be charged to charge the apparatus to be charged.

The charging module 10 includes a main board 11 and electronic components (not illustrated) arranged on the main board 11. One end of the charging module 10 is electrically connected to the plug 22, and the other end of the charging module 10 is electrically connected to the apparatus to be charged to charge the apparatus to be charged. Here, the apparatus to be charged may be an electronic device such as a smart mobile terminal, a mobile power supply, a notebook computer, a drone, an e-book, an electronic cigarette, a smart wearable device, and a sweeping robot. A charging object to which the charger is applied is not limited here.

In some embodiments, the plug structure 20 is a two-pole plug. That is, the two-pole plug includes two pins. It can be understood that the plug structure 20 can also be a two-pole grounding plug. The two-pole grounding plug includes three pins.

In some embodiments, the plug structure 20 includes the plug body 21 and the plug 22. The plug body 21 has an accommodating groove 211 configured to accommodate the plug 22. The plug 22 is close to a top end 210 of the plug body 21, and the accommodating groove 211 extends towards the top end 210 of the plug body 21. A first position and a second position are two different positions on the accommodating groove 211. A distance between the first position and the top end 210 of the plug body 21 is different from a distance between the second position and the top end 210 of the plug body 21. The first position may be located at an end of the accommodating groove 211, and the second position may be located at another end of the accommodating groove 211. It can be understood that the first position and the second position may alternatively be located in a middle region of the accommodating groove 211. In addition, a plurality of first positions and a plurality of second positions may be provided. As long as there is a certain distance between the first position and the second position along an extending direction of the accommodating groove 211, the first position and the second position are not limited in quantities thereof here.

In some embodiments, the plug body 21 may be a rectangular box body. Two short side ends of the plug body 21 are a bottom end and the top end 210 of the plug body 21, respectively. The extending direction of the accommodating groove 211 is parallel to a direction along a long side of the plug body 21.

The plug 22 includes a rotating shaft 221 and a plurality of pins 222. The rotating shaft 221 is slidably arranged in the accommodating groove 211 and is rotatable to at least the first position and the second position. That is, the rotating shaft 221 is movable along the accommodating groove 211 towards or away from the top end 210 of the plug body 21, between the first position and the second position.

Figure 3:
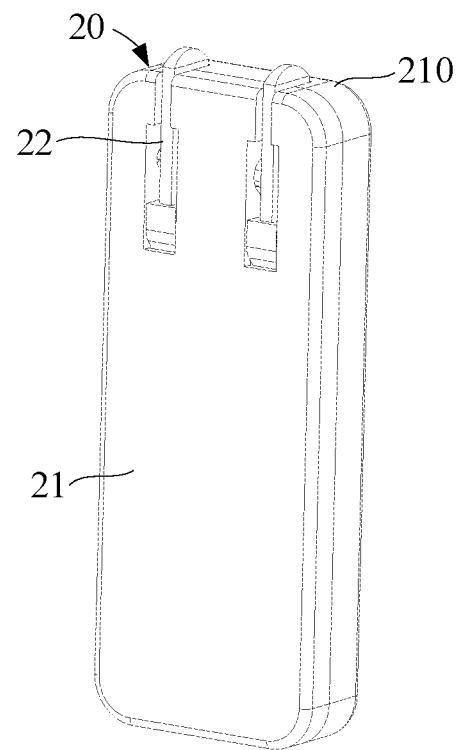
FIG. 3 is a perspective view of the charger illustrated in FIG. 1 in another state.
Figure 4:
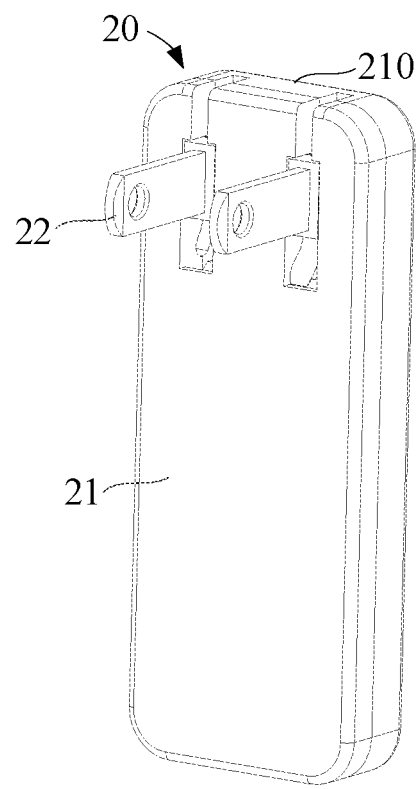
FIG. 4 is a perspective view of the charger illustrated in FIG. 1 in another state.

Referring to FIG. 3, when the rotating shaft 221 is rotated to the first position, the plurality of pins 222 is accommodated in the accommodating groove 211, the rotating shaft 221 abuts against a bottom of the accommodating groove 211, and the plug 22 of the plug structure 20 is in a retracted state. Referring to FIG. 4, when the rotating shaft 221 is rotated towards the top end 210 of the plug body 21 from the first position to the second position, the rotating shaft 221 moves towards the top end 210 of the plug body 21, the rotating shaft 221 slides to a position having a first distance from an end surface of the top end 210 of the plug body, and the plurality of pins 222 protrudes out of the accommodating groove 211 and is perpendicular to the plug body 21. In this way, the plug structure 20 can be plugged into an external socket to operate in the working state.

The plug 22 can be in a retracted state in which the plug 22 is retracted in the accommodating groove 211. In this way, when the plug structure 20 is not in use, the plug 22 can be retracted to reduce a space occupied by the plug 22, which is convenient for carrying and storage.

Figure 5:
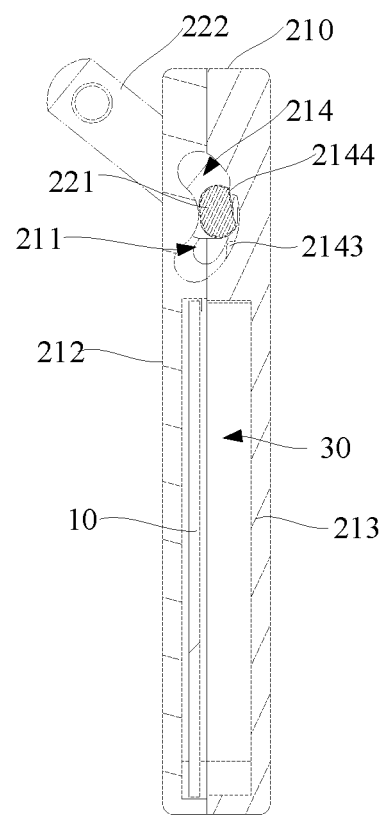
FIG. 5 is a cross-sectional view of the charger illustrated in FIG. 1.
Figure 6:
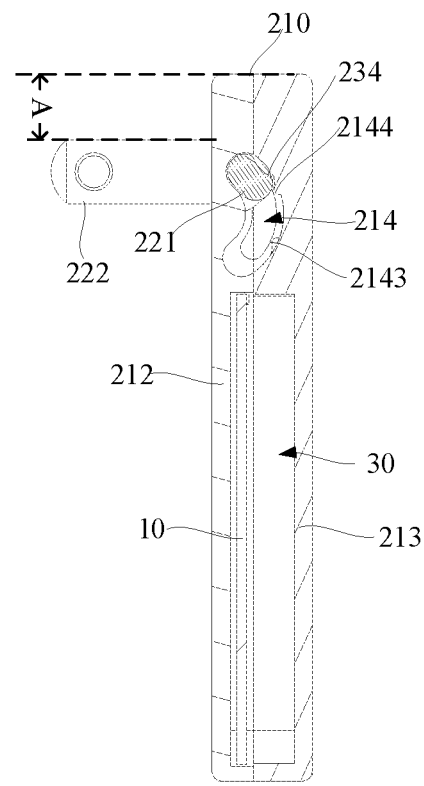
FIG. 6 is a schematic diagram showing a structure of the charger illustrated in FIG. 1 with pins thereof in a working state.

Referring to FIG. 5 and FIG. 6, when there is a need for the plug structure 20 to expand the plug 22 for use, the plug 22 can slide along the accommodating groove 211 towards the top end 210 of the plug body 21 to the second position. The plurality of pins 222 protrudes out of the accommodating groove 211 and is perpendicular to the plug body 21, such that the plug can be plugged into an external socket to enable the plug structure 20 to operate in the working state. Since the second position is a position to which the rotating shaft 221 slides and which has a first distance A from the end surface of the top end 210 of the plug body, the second position is closer to the end surface of the top end 210 of the plug body 21 than the first position. When the rotating shaft 221 slides to the position having the first distance A from the end surface of the top end 210 of the plug body, the plurality of pins 222 can be close to the end surface of the top end 210 of the plug body 21, such that a distance between each of the plurality of pins 222 and the end surface of the top end 210 of the plug body is shortened.

In a conventional plug, when a pin is in a working state, a distance between an edge of the plug body and the pin is usually at least 15.8 mm, which is a relatively great value and occupies a relatively large space. When the conventional plug structure is plugged into a socket, the plug structure may occupy a relatively large space since the edge of the plug body occupies a large area. In this case, a socket body "invades" a jack of the socket in an adjacent position, which affects the use of the adjacent position in the socket, and leads to an occurrence of an "overlord plug" phenomenon.

Referring to FIG. 4, the plug 22 in the plug structure 20 is in the working state. In this case, the plug 22 in the second position is closer to the end surface of the top end 210 of an end of the plug body 21 than the plug 22 in the first position, and a distance between the pins 222 and the end surface of the top end 210 of the end of the plug body 21 is shortened. Therefore, the distance between the pins 222 of the plug structure 20 in the working state and the end surface of the top end 210 of the plug body 21 is shortened, thereby reducing a space occupied by the edge of the plug structure 20. When the plug structure 20 is plugged into the socket, the plug structure 20 neither "invades" a space of the adjacent position in the socket, nor affects plugging and use of another plug structure.

In some embodiments, when the plurality of pins 222 is in the second position, the first distance A between the rotating shaft 221 and a bottom of the accommodating groove 211 is 6.5 mm. Therefore, in the extending direction of the accommodating groove 211, the distance between the pin 222 and the end surface of the top end of the plug body 21 can reach 6.5 mm. The distance between the end surface of the top end 210 of the plug structure 20 and the plurality of pins 222 needs to be at least 6.5 mm to prevent fingers from contacting a plug insert and getting an electric shock and satisfy safety codes and standards of the plug structure 20.

In addition, a minimum distance between the end surface of the top end 210 of the plug body 21 and the pins 222 can be 6.5 mm to minimize a space occupied by an outer edge of the plug body 21, thereby avoiding the occurrence of the "overlord plug" phenomenon to the greatest extent under the premise of ensuring the safe use of the plug structure.

In some embodiments, referring to FIG. 2, the plug body 21 includes an upper housing 212 and a lower housing 213 that fit with and are connected to each other, and the upper housing 212 and the lower housing 213 together define the accommodating groove 211. The upper housing 212 and the lower housing 213 may be fixedly connected to each other by means of snapping, screwing, or hot melting. In other embodiments, the plug body 21 is not limited to being divided into two structural portions, i.e., an upper portion and a lower portion, and may alternatively be of another form of structural composition. The structural composition of the plug body 21 is not limited here.

Figure 7:
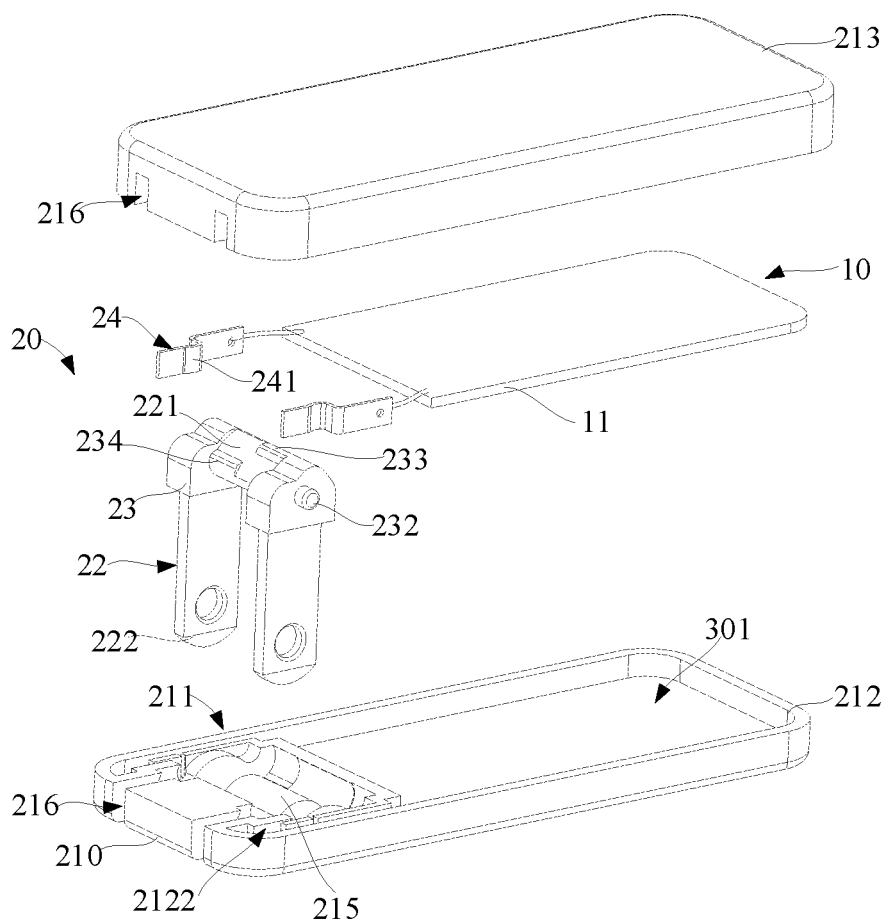
FIG. 7 is an exploded view of the charger illustrated in FIG. 2 observed from another perspective.

Referring to FIG. 7, the upper housing 212 has an upper accommodating chamber 301 defined therein. The main board 11 is fixed in the upper accommodating chamber 301. In addition, a shape of the upper accommodating chamber 301 matches a shape of the main board 11. The main board 11 is snapped into and fixed in the upper accommodating chamber 301 of the upper housing 212.

Figure 8:
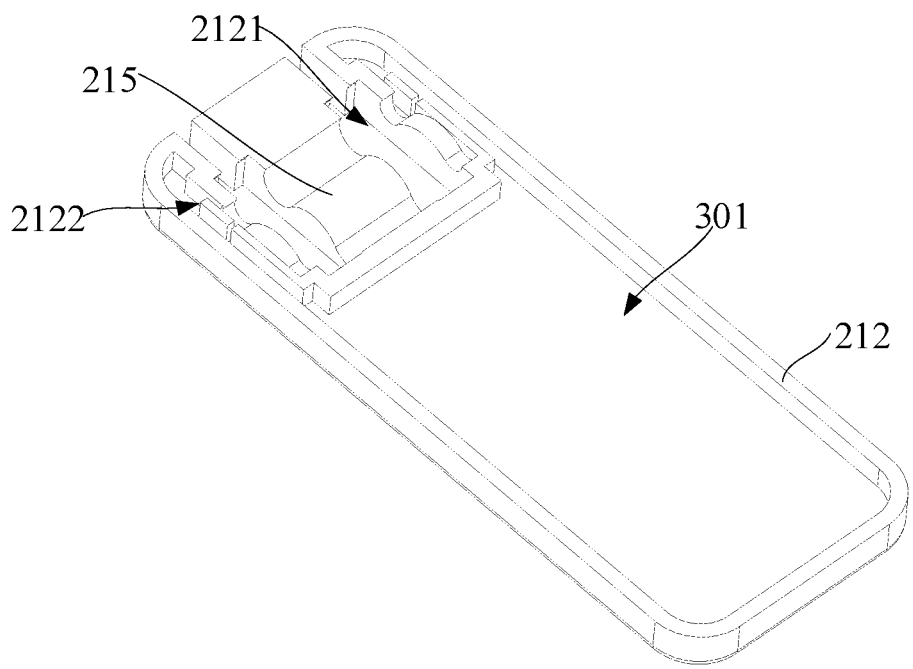
FIG. 8 is a schematic diagram showing a structure of an upper housing illustrated in FIG. 6.

Referring to FIG. 8, the upper housing 212 has via holes 2121 defined thereon, and the via holes 2121 are configured for the pins 222 to be rotated out of the accommodating groove 211. The via holes 2121 are in communication with the accommodating groove 211, and the pins 222 are rotatable from a side of the upper housing 212 to an outer side of the plug body 21.

Figure 9:
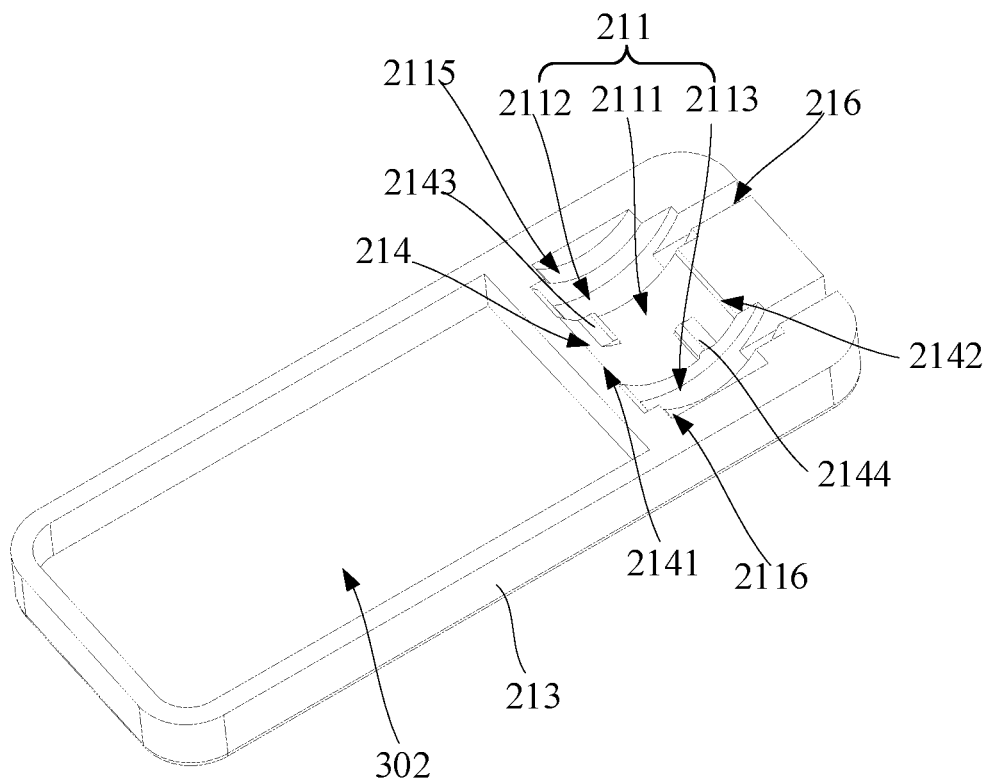
FIG. 9 is a schematic diagram showing a structure of a lower housing illustrated in FIG. 2.

Referring to FIG. 9, the lower housing 213 has a lower accommodating chamber 302. The lower accommodating chamber 302 corresponds to electronic components arranged on the main board 11. In addition, a shape of the lower accommodating chamber 302 matches the shape of the upper accommodating chamber 301. The upper housing 212 and the lower housing 213 may be injection-molded plastic members. In addition, the upper housing 212 and the lower housing 213 are formed as an integrative structure. The upper housing 212 and the lower housing 213 may be fabricated at a high precision to facilitate molding.

The accommodating groove 211 includes a first accommodating groove 2111 configured to accommodate the rotating shaft 221 and a second accommodating groove 2112 and a third accommodating groove 2113 that are configured to accommodate two pins 222, respectively. The two pins 222 are located on two sides of the rotating shaft 221, respectively, and the second accommodating groove 2112 and the third accommodating groove 2113 are located on two sides of the first accommodating groove 2111, respectively. The rotating shaft 221 moves along the first accommodating groove 2111, and the two pins 222 move along the second accommodating groove 2112 and the third accommodating groove 2113, respectively.

In some embodiments, the first accommodating groove 2111 is arc-shaped, and the rotating shaft 221 is rotatable along the first accommodating groove 2111 to the second position. Correspondingly, the second accommodating groove 2112 and the third accommodating groove 2113 are also arc-shaped. When the rotating shaft 221 moves along the first accommodating groove 2111, the two pins 222 also follows to move along the second accommodating groove 2112 and the third accommodating groove 2113. Groove opening widths of the second accommodating groove 2112 and the third accommodating groove 2113 match widths of the two pins 222 to enable the two pins 222 to be stably accommodated in the second accommodating groove 2112 and the third accommodating groove 2113 in a one-to-one correspondence.

In some embodiments, the first accommodating groove 2111 includes an arc groove 214. The arc groove 214 is arranged on the lower housing 213. The upper housing 212 has a boss 215 matching a shape of the arc groove 214. A channel configured for sliding of the plug 22 is defined between a top surface of the boss 215 of the upper housing 212 and a bottom surface of the arc groove 214. It can be understood that the channel can alternatively be directly defined in the upper housing 212 or the lower housing 213.

The rotating shaft 221 is rotatable to the second position along the arc groove 214. The bottom surface of the arc groove 214 is shaped as an arc concave surface, and the boss 215 has an arc convex surface. The arc concave surface and the arc convex surface match each other, and form an arc channel. The rotating shaft 221 is slidable along the arc channel.

In some embodiments, a first position 2141 and a second position 2142 correspond to two ends of the arc groove 214, respectively. When the rotating shaft 221 moves along the arc groove 214, by virtue of the shape of the arc groove 214, the rotating shaft 221 can be rotated easily to exert a pushing force to enable the pins 222 to slide and rotate along the arc groove 214. The first position 2141 and the second position 2142 are located at the two ends of the arc groove 214, respectively, and a length of the arc groove 214 can be minimized, thereby reducing a volume of the plug body 21.

It can be understood that, in other embodiments, the first position and the second position may alternatively be located in a middle portion of the arc groove 214, and the arc concave surface may also be located in a middle segment region of the arc groove 214.

For convenience of description, one end of the arc groove 214 is correspondingly the first position 2141, and the other end of the arc groove 214 is correspondingly the second position 2142. The second position 2142 is close to the end surface of the top end 210 of an end of the lower housing 213. Here, when the rotating shaft 221 is located at the first position 2141 of the arc groove 214, the plug 22 is in the retracted state. When the rotating shaft 221 slides to the second position 2142 along the arc groove 214, the plug 22 is rotated relative to the arc groove 214, the top end 210 of the plug 22 is rotated out of the accommodating groove 211 from the via holes 2121 to enable the pins 222 to be rotated to the working state and the rotating shaft 221 to be located at the second position 2142. When the pins 222 are in the working state, the pins 222 are perpendicular to a surface of the plug body 21, thereby ensuring that the pins 222 can be stably plugged into the jacks of the socket.

In some embodiments, with continued reference to FIG. 2 and FIG. 7, each pin 222 has a connecting member 23 provided at a bottom thereof. The rotating shaft 221 is connected to the two pin 222 through the connecting member 23, such that the rotating shaft 221 can drive the two pins 222 to move together.

The connecting member 23 may be injection-molded from materials such as plastic and rubber. The connecting member 23 at least partially wraps the bottom of the pin 222, and can provide insulation protection to the bottom of the pin 222. In addition, the connecting member 23 can be slidably arranged on the arc groove 214. The connecting member 23 wraps the bottom of the pin 222, and the pin 222 is not in direct contact with the arc groove 214. Both the connecting member 23 and the lower housing 213 are injection-molded plastic members, and thus a small frictional resistance is present between the connecting member 23 and the arc groove 214, thereby facilitating sliding and rotation of the pin 222.

In addition, the connecting member 23 has a bottom that is arc-shaped. The arc-shaped bottom of the connecting member 23 can reduce a contact area between the connecting member 23 and the arc groove 214, and ensure that the connecting member 23 can also slide and rotate smoothly along the arc groove 214.

Since at least two pins 222 are provided, the rotating shaft 221 is connected to two pins 222. By connecting the two pins 222 with the rotating shaft 221 located between the two pins 222 and enabling the two pins 222 to slide along the arc groove 214, the two pins 222 can maintain a consistent moving trajectory, such that the two pins 222 can move synchronously. The rotating shaft 221 has an arc-shaped side surface that can reduce a contact area between the rotating shaft 221 and the arc groove 214, thereby ensuring that the pins 222 can smoothly slide and rotate along the arc groove 214.

Referring to FIG. 5, in some embodiments, a cross section of the rotating shaft 221 is ellipse-shaped. When the rotating shaft 221 slides and rotates along the arc groove 214, a long-axis direction of the ellipse is parallel to an extending direction of the arc groove 214. In conjunction with FIG. 7, when the rotating shaft 221 moves to the second position 2142 of the arc groove 214, the rotating shaft 221 is rotated to enable that an outer surface of the rotating shaft 221 and an inner side wall of the arc groove 214 can abut against each other to fix and support the rotating shaft 221, ensure that the pins 222 can be stably limited to the second position 2142 of the arc groove 214, and guarantee that the pins 222 can be in a stable working state for normal use.

Referring to FIG. 9, the accommodating groove 211 has a limiting member provided at a bottom thereof. When the rotating shaft is rotated to the first position 2141 or the second position 2142, the rotating shaft 221 is connected to the limiting member in a position limiting manner.

In some embodiments, the arc groove 214 has a first limiting member 2143 arranged at a position close to the first position. The first limiting member 2143 is arranged at a position in the accommodating groove 211 close to the first position. When the pins are retracted in the accommodating groove, the rotating shaft 221 abuts against the first limiting member 2143 in a position limiting manner. The first limiting member 2143 has a guiding surface. The guiding surface of the first limiting member 2143 can facilitate smooth sliding of the pins 222 from the first position 2141 to the second position 2142 via the first limiting member 2143.

The limiting member includes a second limiting member 2144. The second limiting member 2144 is arranged at a position in the accommodating groove 211 close to the second position 2142. Specifically, the arc groove 214 has the second limiting member 2144 arranged at the position close to the second position 2142. When the rotating shaft 221 is rotated to the second position 2142, the rotating shaft 221 abuts against the second limiting member 2144 in a position limiting manner.

The second limiting member 2144 also has a guiding surface. The guiding surface of the second limiting member 2144 has a smooth transition along a direction from the first position 2141 to the second position 2142, thereby facilitating the sliding of the rotating shaft 221 along the arc groove 214, and enabling the rotating shaft 221 to smoothly slide to the second position 2142 of the arc groove 214, thereby maintaining the working state of the pin 222.

In addition, the first limiting member 2143 and the second limiting member 2144 are elongated and extend along a direction parallel to an axial direction of the rotating shaft 221. Therefore, each of the first limiting member 2143 and the second limiting member 2144 can have a large contact area with the rotating shaft 221, thereby ensuring that the first limiting member 2143 and the second limiting member 2144 can maintain stable contact with the rotating shaft 221 in a position limiting manner.

The first limiting member 2143 and the second limiting member 2144 are staggered, and the first limiting member 2143 and the second limiting member 2144 are located on two opposite sides of the bottom surface of the arc groove 214, respectively.

Correspondingly, referring to FIG. 7 again, the rotating shaft 221 has a convex rib provided thereon. The convex rib is configured to cooperate with and abut against the limiting member in a position limiting manner. The convex rib includes a first convex rib 233 and a second convex rib 234. The first convex rib 233 and the second convex rib 234 are staggered, such that the first convex rib 233 may abut against the first limiting member 2143 and the second convex rib 234 may abut against the second limiting member 2144.

Figure 10:
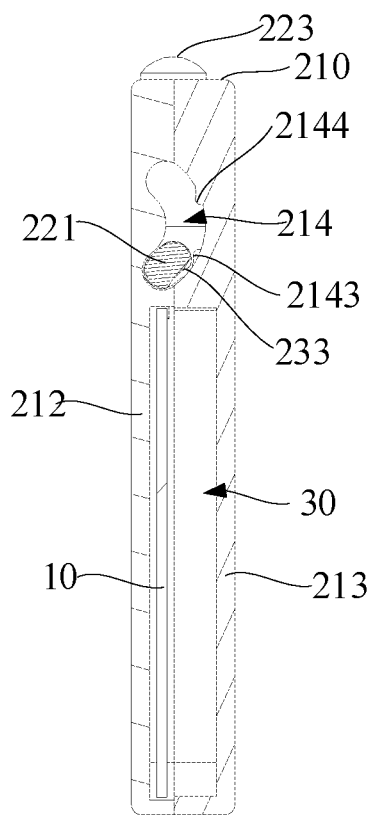
FIG. 10 is a schematic diagram showing a structure of the charger illustrated in FIG. 1 with pins thereof in a retracted state.
Figure 11:
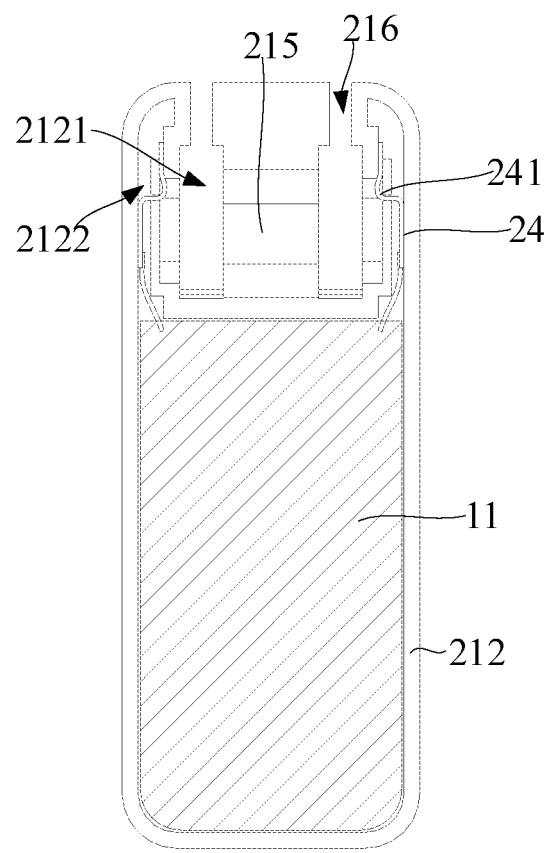
FIG. 11 is a schematic diagram showing a structure of the charger illustrated in FIG. 1 with an elastic conductive sheet mounted on an upper housing thereof.

Referring to FIG. 10, when the pins 222 are in the retracted state, the first convex rib 233 of the rotating shaft 221 and the first limiting member 2143 on the arc groove 214 abut against each other, such that positions of the pins 222 are limited to the retracted state. When the rotating shaft 221 slides and rotates along the arc groove 214 and moves to the second position 2142 of the arc groove 214, the second convex rib 234 of the rotating shaft 221 cooperates with and abuts against the second limiting member 2144 on the arc groove 214, such that positions of the pins 222 are limited to the working state, as illustrated in FIG. 11.

In addition, the pins 222 in the retracted state are perpendicular to the pins 222 in the working state. Therefore, the first convex rib 233 and the second convex rib 234 on the rotating shaft 221 correspond to a central angle of 90 degrees of the rotating shaft 221 to ensure that the rotating shaft 221 can be rotated by 90 degrees, and the pins 222 can be rotated from the retracted state to the working state, where the pins in the working state are perpendicular to the pins in the retracted state.

With reference to FIG. 2 again, in some embodiments, the accommodating groove 211 has through grooves 216 defined in an end thereof facing away from the first position 2141. The through grooves 216 are in communication with an outer side of the plug body 21. When the rotating shaft 221 is located in the first position 2141, each of the pins 222 is partially accommodated in the through groove 216. Specifically, the through grooves 216 are arranged at the second position 2142 of the arc groove 214. Each through groove 216 extends along the extending direction of the arc groove 214. The arc groove 214 is in communication with the outer side of the plug body 21 via the through grooves 216, and the through grooves 216 are configured to accommodate the plug 22.

In addition, in some embodiments, the through grooves 216 may be defined by the upper housing 212 and the lower housing 213 together. Both the upper housing 212 and the lower housing 213 have the through grooves 216 defined thereon.

A groove opening width of the through groove 216 is smaller than a groove opening width of the via hole 2121. The through groove 216 only needs to partially accommodate the pin 22. The groove opening width of the through groove 216 is smaller than that the groove opening width of the accommodating groove 211 to improve structural compactness of the plug structure 20.

In some embodiments, a length of the accommodating groove 211 is smaller than a length of each pin 222, and an end portion 223 of the pin 222 protrudes out of the through groove 216. When the pin 222 is in the retracted state, i.e., when the rotating shaft 221 is in the first position, the end portion 223 of the pin 222 is located outside the plug body 21, which is convenient for manually holding the pin 222 and rotating the pin 222 with a force.

In addition, the plug body 21 has the through grooves 216 defined to further achieve a short length of the accommodating groove 211 of the plug body 21. The pin 222 can be accommodated in the accommodating groove 211 of the short length, such that the pin 222 can be in the retracted state. In this way, it is avoided that to accommodate the pin 222, the plug structure 20 has the accommodating groove 211 of a large length defined therein, and the accommodating groove 211 of the large length causes the plug structure 20 to occupy a large area.

When the rotating shaft 221 moves in the arc groove 214, the pins 222 can slide relative to and along the arc groove 214 in the extending direction of the arc groove 214, can also be rotated relative to the arc groove 214. In addition, an order of the sliding and the rotation of the pin 222 relative to the arc groove 214 is not limited, and the pins 222 can slide before being rotated, or be rotated before sliding. In some embodiments, simultaneous to the relative movement of the pins 222 in the arc-shaped arc groove 214, the pins are rotated.

With reference to FIG. 9 again, in some embodiments, two side walls of the accommodating groove 211 further have a first guide groove 2115 and a second guide groove 2116. The first guide groove 2115 and the second guide groove 2116 are respectively located on two sides of the accommodating groove 211. Each pin 222 has a convex post 232 protruding from an outer side thereof. The convex post 232 is electrically connected to the pin 222. The convex posts 232 can be slidably arranged in the first guide groove 2115 and the second guide groove 2116. The convex posts 232 slide along the first guide groove 2115 and the second guide groove 2116, which helps the rotating shaft 221 to slide and rotate stably.

The convex posts 232 and the rotating shaft 221 are located on a same axis. Therefore, shapes of the first guide groove 2115 and the second guide groove 2116 are the same. Here, heights of the first guide groove 2115 and the second guide groove 2116 match heights of the convex posts 232, such that the convex posts 232 can slide and rotate along the first guide groove 2115 and the second guide groove 2116.

In addition, the convex post 232 is a conductor. The convex post 232 is electrically connected to the pin 222. The convex post 232 may be a metallic convex post. The convex post 232 is electrically connected to the bottom of the pin 222 in the interior of the connecting member 23.

The plug structure 20 includes elastic conductive sheets 24 that are arranged in the accommodating groove 211. Each elastic conductive sheet 24 is arranged on an inner side of the accommodating groove 211 and faces towards one of the pins 222. An end of the elastic conductive member 24 is electrically connected to the pin 222, and another end of the elastic conductive sheet 24 is electrically connected to the charging module 10 via a wire.

Figure 12:
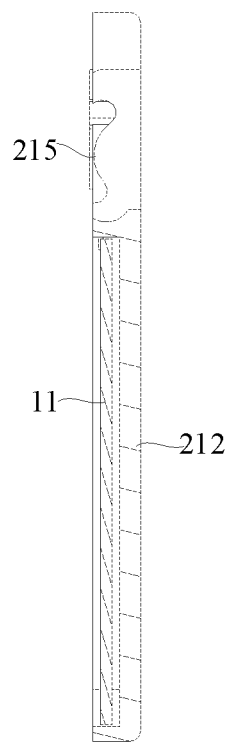
FIG. 12 is a cross-sectional view of the charger illustrated in FIG. 11.

Referring to FIG. 11 and FIG. 12, specifically, the elastic conductive sheets 24 are mounted on the upper housing 212. The upper housing 212 has snapping grooves 2122. The two ends of the elastic conductive sheet 24 are snapped into and fixed in the snapping groove 2122. The elastic conductive member 24 is electrically connected to the main board 11 via a wire. In some embodiments, the upper housing 212 has the snapping grooves 2122 provided on two sides of the boss 215.

Each elastic conductive sheet 24 has an elastic portion 241. A shape of the snapping groove 2122 matches the elastic conductive member 24, such that the elastic portion 241 can be snapped into the snapping groove 2122 to limit a position of the elastic conductive sheet 24.

Figure 13:
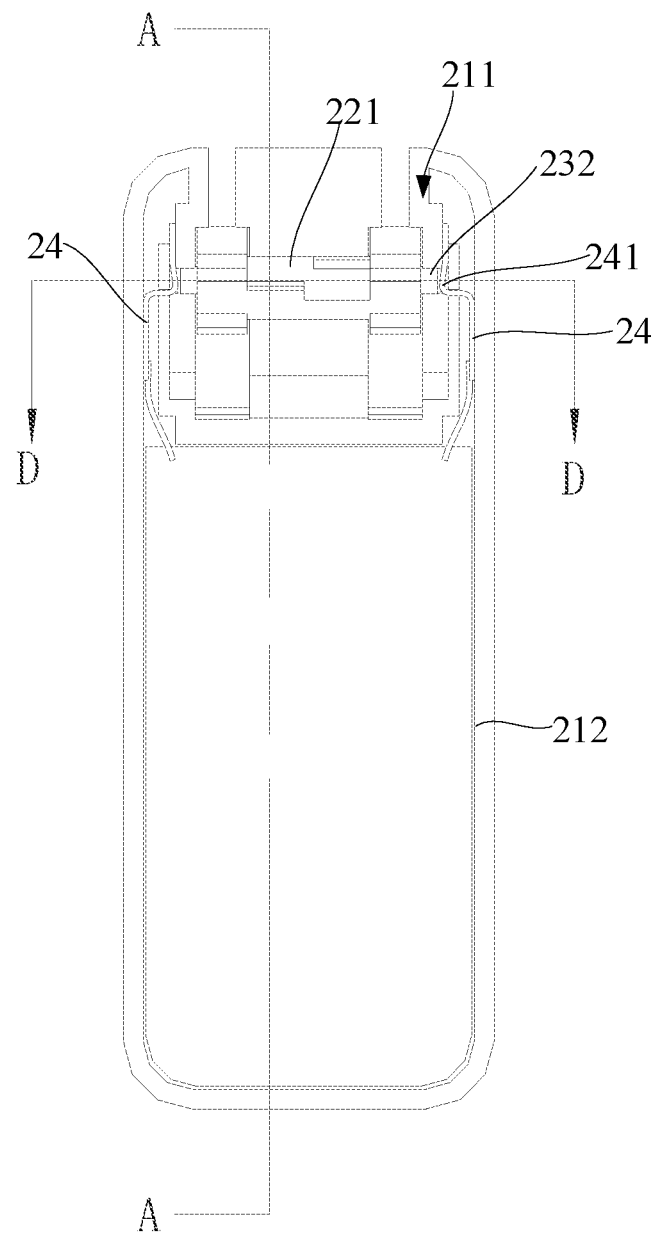
FIG. 13 is a schematic diagram showing a partial structure of the charger illustrated in FIG. 10.

Referring to FIG. 13, two elastic conductive sheets 24 are provided, which are provided on two opposite sides of the plurality of pins 222 in an axial direction of the rotating shaft 231, respectively. The convex posts 232 protrude outwards relative to the two opposite sides of the plurality of pins 222, such that the convex posts 232 are in contact with the elastic conductive sheets 24 in one-to-one correspondence to realize electrical connection.

Figure 14:
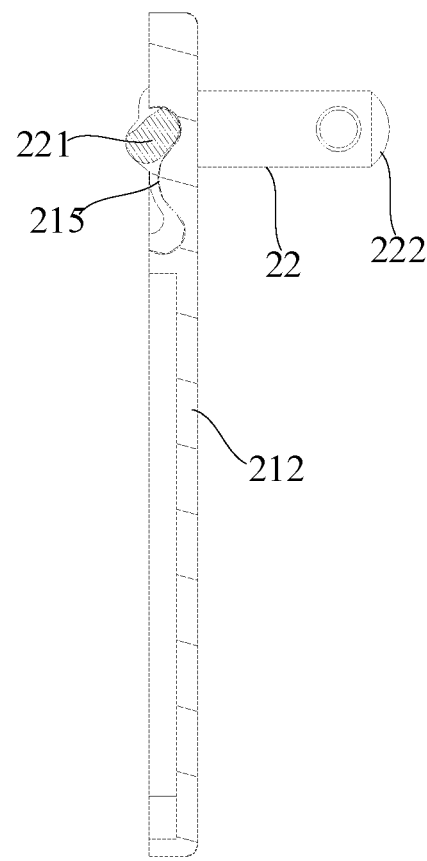
FIG. 14 is a cross-sectional view of the charger illustrated in FIG. 13 taken along a direction A-A.
Figure 15:
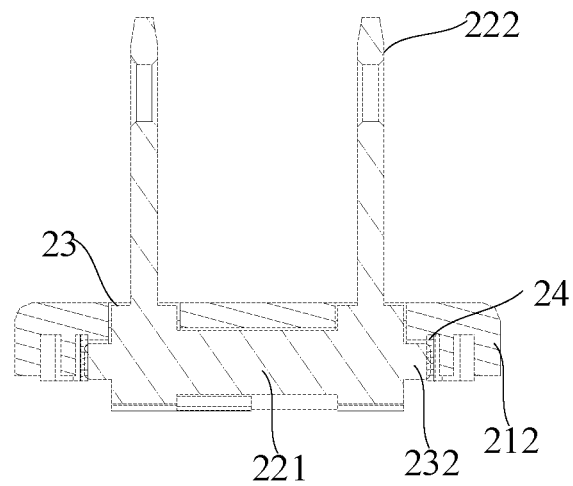
FIG. 15 is a cross-sectional view of the charger illustrated in FIG. 13 taken along a direction D-D.

Referring to FIG. 14 and FIG. 15, when the pins 222 are rotated to the working state, the elastic portions 241 are squeezed by the convex posts 232 and deform elastically to generate an elastic resilience force. Specifically, the elastic conductive sheets 24 are formed by bending a metallic sheet, and the elastic portions 241 have elasticity after the bending.

When the upper housing 212 and the lower housing 213 are bonded to other, the boss 215 of the upper housing 212 faces the arc groove 214 of the lower housing 213, and the elastic conductive sheets 24 face the outer sides of the pins 222. Referring to FIG. 8 and FIG. 9, when the elastic portions 241 correspond to the second position 2142 of the sliding groove, the convex posts 232 protrude from the outer side of the plurality of pins 222. When the plurality of pins 222 is located at the second position 2142, the convex posts 232 abut against the elastic portions 241 of the elastic conductive sheets 24 in such a manner that the elastic conductive sheets 24 deform and then the elastic conductive sheets 24 are electrically connected to the plurality of pins 222.

In the plug structure 20, the plurality of pins 222 can be accommodated in the accommodating groove 211 when in the retracted state. When the pins 222 need to be stretched for use, the pins 222 can slide and rotate along the accommodating groove 211 to be stretched out for use. Therefore, when the plug structure 20 is not in use, the pins 222 are retracted to reduce the space occupied by the pins 222 and facilitate carrying and storage of the plug structure 20.

When the pins 222 slide to the working state, the position of the pins 222 moves towards an edge of the plug body 21 to shorten a distance between the pins 222 and the edge of the plug body 21. Therefore, when the plug structure 20 is plugged into the socket, the plug structure 20 occupies a small space and does not "invade" the space of an adjacent position in the socket.

In other embodiments, the plug may be the two-pole grounding plug, and thus the plug structure includes three pins. The three pins can be one grounding pin and two electrode pins. The two electrode pins can have one rotating shaft arranged therebetween, and the accommodating groove of the plug body can have the sliding groove defined therein, such that the rotating shaft can slide and rotate along the sliding groove to drive the two electrode pins to move.

The grounding pin can be rotatably arranged on the plug body. When the two electrode pins are in the retracted state, the grounding pin is also in the retracted state, and can be accommodated between the two electrode pins. When the two electrode pins are in the working state, the grounding pin is also in the working state, such that the two-pole grounding plug can be plugged normally for use.

Therefore, the two-pole grounding plug can also reduce an occupied volume and facilitate storage and carrying. Also, a distance between an edge of the two-electrode grounding plug and each pin is also short, such that the two-pole grounding plug does not invade space of an adjacent position in the socket to affect normal use of another plug, thereby avoiding the occurrence of the "overlord plug" phenomenon.

Figure 16:
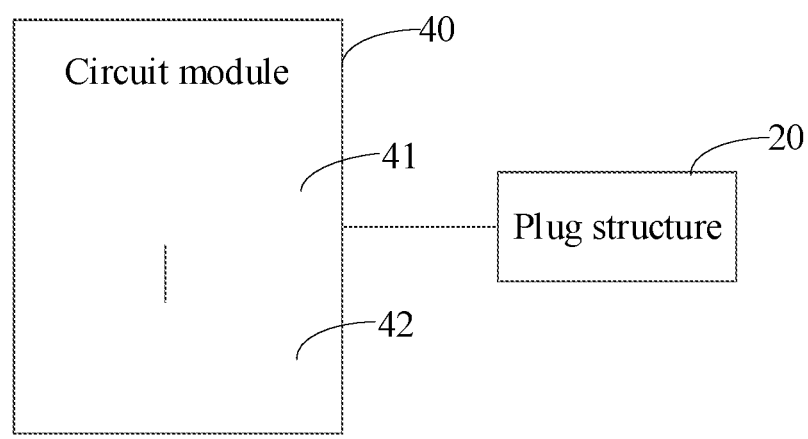
FIG. 16 is a schematic diagram showing electronic modules of an electronic device according to an embodiment of the present disclosure.

Referring to FIG. 16, in other embodiments, the electronic device may alternatively be a mobile power supply. The circuit module 40 further includes an energy storage unit 41 configured to store electric energy and a charging and discharging circuit 42. The energy storage unit 41 is electrically connected to the charging and discharging circuit 42. The charging and discharging circuit 42 can be configured to charge the energy storage unit 41, and the energy storage unit 41 can supply power to an external power consumption apparatus through the charging and discharging circuit 42.

In other embodiments, the circuit module may alternatively be other power supply circuits. The power supply circuit is electrically connected to the pins of the plug structure to establish a connection with an external power source through the plug structure, and supply power to a power consumption apparatus through the power supply circuit. The power supply circuit may be, e.g., a transformer conversion circuit. The electronic device can be an adapter, a power adapter, or the like.

In addition, in other embodiments, the circuit module detachably connected to the plug structure. The circuit module can be an independent structure relative to the plug structure, and the circuit module and the plug structure can be electrically connected to each other by a plugging wire. For example, when the circuit module is a power bank, the plug structure may be a charging plug. The power bank can be independent of the plug structure to facilitate carrying.

Although the present disclosure has been described with reference to several typical embodiments, it should be understood that terms used in the present disclosure are illustrative and exemplary, rather than restrictive. Since the present disclosure can be implemented in various forms without departing from the spirit or essence of the present disclosure, it should be understood that the above embodiments, instead of being construed as being limited to any of the details described above, should be interpreted broadly within the spirit and scope defined by the claims as attached.

Therefore, all changes and modifications falling within the scope of the claims or their equivalents shall be encompassed by the claims as attached.

What is claimed is:

1. A plug structure, comprising:
   a plug comprising a rotating shaft and a plurality of pins; and
   a plug body having an accommodating groove configured to accommodate the plug,
   wherein the rotating shaft is slidably arranged in the accommodating groove and is rotatable to at least a first position and a second position;
   when the rotating shaft is rotated to the first position, the plurality of pins is accommodated in the accommodating groove; and
   when the rotating shaft is rotated towards a top end of the plug body from the first position to the second position, the plurality of pins protrudes out of the plug body from the accommodating groove,
   wherein the accommodating groove comprises an arc groove, and the rotating shaft is rotatable to the second position along the arc groove.

2. The plug structure according to claim 1, wherein the accommodating groove has a limiting member provided at a bottom thereof, and when the rotating shaft is rotated to the first position or the second position, the rotating shaft is connected to the limiting member in a position limiting manner.

3. The plug structure according to claim 2, wherein the limiting member comprises a first limiting member arranged at a position in the accommodating groove close to the first position, and when the plurality of pins is accommodated in the accommodating groove, the rotating shaft abuts against the first limiting member in a position limiting manner.

4. The plug structure according to claim 2, wherein the limiting member comprises a second limiting member arranged at a position in the accommodating groove close to the second position, and when the rotating shaft is rotated to the second position, the rotating shaft abuts against the second limiting member in a position limiting manner.

5. The plug structure according to claim 2, wherein the rotating shaft has a convex rib provided thereon, and the convex rib is configured to cooperate with and abut against the limiting member in a position limiting manner.

6. The plug structure according to claim 1, wherein each of the plurality of pins has a connecting member at least partially wrapping a bottom thereof, and the rotating shaft is connected to the pin through the connecting member.

7. The plug structure according to claim 6, wherein the connecting member has a bottom that is arc-shaped.

8. The plug structure according to claim 1, wherein the plurality of pins comprises two pins, and the accommodating groove comprises a first accommodating groove configured to accommodate the rotating shaft and a second accommodating groove and a third accommodating groove that are configured to accommodate the two pins.

9. The plug structure according to claim 1, wherein a distance between the first position and an end surface of the top end of the plug body is greater than a distance between the second position and the end surface of the top end of the plug body.

10. The plug structure according to claim 1, wherein a distance between the second position and an end surface of the top end of the plug body is greater than or equal to 6.5 mm.

11. The plug structure according to claim 1, wherein the accommodating groove has through grooves defined in an end thereof facing away from the first position, the through grooves are in communication with an outer side of the plug body, and when the rotating shaft is located at the first position, each of the plurality of pins is partially accommodated in one of the through grooves.

12. The plug structure according to claim 11, wherein the pin has a length greater than a length of the accommodating groove, and when the rotating shaft is rotated to the first position, an end portion of the pin protrudes out of the through groove.

13. The plug structure according to claim 1, further comprising elastic conductive sheets arranged on an inner side of the accommodating groove and face towards the plurality of pins, the elastic conductive sheets being electrically connected to the plurality of pins.

14. The plug structure according to claim 13, wherein each of the plurality of pins has a convex post protruding from an outer side thereof and electrically connected to the pin, and the convex post is configured to press one of the elastic conductive sheets when the rotating shaft is rotated to the second position, in such a manner that the elastic conductive sheet deforms and clamps the convex post to achieve an electrical connection.

15. The plug structure according to claim 14, wherein the convex post and the rotating shaft are located on a same axis.

16. The plug structure according to claim 1, wherein the plug body comprises an upper housing and a lower housing that fit with and are connected to each other, and the upper housing and the lower housing together define the accommodating groove.

17. An electronic device, comprising a circuit module and a plug structure, the plug structure comprising:
   a plug comprising a rotating shaft and a plurality of pins; and
   a plug body having an accommodating groove configured to accommodate the plug,
   wherein the rotating shaft is slidably arranged in the accommodating groove and is rotatable to at least a first position and a second position;
   when the rotating shaft is rotated to the first position, the plurality of pins is accommodated in the accommodating groove; and
   when the rotating shaft is rotated towards a top end of the plug body from the first position to the second position, the plurality of pins protrudes out of the plug body from the accommodating groove,
   wherein the circuit module is electrically connected to the plurality of pins of the plug structure, and
   wherein the accommodating groove comprises an arc groove, and the rotating shaft is rotatable to the second position along the arc groove.

18. The electronic device according to claim 17, wherein the plug body of the plug structure further has an accommodating chamber defined therein, and the accommodating chamber is configured to accommodate the circuit module; and/or the circuit module is a charging module.

19. The electronic device according to claim 17, wherein the circuit module comprises an energy storage unit configured to store electric energy and a charging and discharging circuit, and the energy storage unit is electrically connected to the charging and discharging circuit.

* * * * *